(12) United States Patent
Buonocunto (10) Patent No.: US 6,784,624 B2
(45) Date of Patent: Aug. 31, 2004

(54) ELECTRONIC BALLAST SYSTEM HAVING EMERGENCY LIGHTING PROVISIONS

(76) Inventor: Nicholas Buonocunto, 31 Ogden Ave., White Plains, NY (US) 10605

( * ) Notice: Subject to any disclaimer, the term of this patent is extended or adjusted under 35 U.S.C. 154(b) by 345 days.

(21) Appl. No.: 10/025,318

(22) Filed: Dec. 19, 2001

(65) Prior Publication Data

US 2003/0146714 A1 Aug. 7, 2003

(51) Int. Cl.[7] .............................................. H05B 41/16
(52) U.S. Cl. ..................... 315/247; 315/200 R; 307/64; 307/82
(58) Field of Search ................................ 315/160–161, 315/200 R, 209 R, 224–226, 246–247, 283, 287, 289, 291, 307, DIG. 2, DIG. 5, DIG. 7; 323/207; 363/123, 125, 132; 307/64–65, 82

(56) References Cited

U.S. PATENT DOCUMENTS

| | | | | |
|---|---|---|---|---|
| 5,363,020 A | * | 11/1994 | Chen et al. ............. | 315/209 R |
| 5,515,261 A | * | 5/1996 | Bogdan ........................ | 363/89 |
| 5,568,041 A | * | 10/1996 | Hesterman .................. | 323/207 |
| 5,583,402 A | * | 12/1996 | Moisin et al. .............. | 315/307 |
| 5,612,597 A | * | 3/1997 | Wood .......................... | 315/293 |
| 5,623,187 A | * | 4/1997 | Caldeira et al. ............ | 315/307 |
| 5,808,421 A | * | 9/1998 | Buonocunto ................ | 315/219 |
| 5,907,223 A | * | 5/1999 | Gu et al. ..................... | 315/247 |
| 6,031,342 A | * | 2/2000 | Ribarich et al. ............ | 315/291 |
| 6,034,489 A | * | 3/2000 | Weng .......................... | 315/307 |
| 6,486,616 B1 | * | 11/2002 | Liu et al. .................... | 315/291 |
| 2002/0145393 A1 | * | 10/2002 | Hui et al. ................... | 315/224 |
| 2003/0111968 A1 | * | 6/2003 | Trestman .................... | 315/291 |

* cited by examiner

Primary Examiner—Thuy Vinh Tran (57) ABSTRACT

An electronic ballast system is disclosed for operating one or more fluorescent lamps having a subsystem with universal input from 108V to 305V, a battery, along with a battery charger and associated logic, that provides for emergency lighting, as well for operating at least one of the fluorescent lamps. The electronic ballast system includes a circuit that allows for a fluorescent lamp to be energized without the preheating of it cathodes, as well as includes a circuit for power factor correction that uses of an average current mode implemented by a pulse-width modulator to derive a power factor for the electronic power circuit that approaches unity.

8 Claims, 5 Drawing Sheets

ELECTRONIC BALLAST SYSTEM HAVING EMERGENCY LIGHTING PROVISIONS

BACKGROUND OF THE INVENTION 1.0 Field of the Invention

This invention relates to electronic ballast systems, and, more particularly, to an electronic ballast system for operating fluorescent lamps with universal input (from 108V to 305V) and having a subsystem with a battery, along with a battery charger, and associated logic that provides for emergency lighting.

2.0 Description of Related Art

Electronic ballast systems for operating fluorescent lamps are well known and some of which are disclosed in U.S. Pat. Nos. 5,808,421 and 6,031,342. Electronic ballast systems typically convert a low frequency alternating current source having a relatively low frequency in the range from 50 to 60 Hz to a higher frequency typically in the range of 30–40 kHz. The conversion commonly involves a two stage process, wherein the ac oscillation having a frequency of 50 to 60 Hz is first rectified to a dc voltage and then this dc voltage is chopped at a higher frequency to produce alternating current in the frequency range of 30–40 kHz, which is used to excite the fluorescent lamp. The electronic ballast circuits advantageously perform the desired function for operating fluorescent lamps and reduce the energy consumption, compared to non-electronic ballast circuits, and especially compared to incandescent lamps. However, the conventional electronic ballast circuits typically employ a preheat operating mode that needs to be completed before the fluorescent lamp is excited so as to sequence it into its continuous and efficient running mode. It is desired that an electronic ballast circuit be provided that eliminates the need for preheating the fluorescent lamp before the fluorescent lamp is rendered operative into its continuous operating and efficient running mode.

Electronic ballast circuits are typically selected to have parameters that operate for particular input frequency oscillation. For example, the electronic ballast circuit may have parameters selected so as to operate with the 110 volt, 60 Hz typically found in the United States, whereas other ballast circuits may have parameters selected to operate with 220 volts, 50 Hz typically found in European countries. It is desired to provide a ballast circuit that operates with the universal input covering the range from between 108 to 305 volts at a frequency range between 50–60 Hz.

Further, it is desired to provide an electronic ballast circuit that handles various types of fluorescent lamps such as, T5, T8, T12, 20W, 32W, 40W, 56W, 70W, linear, circular, or U-shaped type fluorescent lamps.

Because fluorescent lamps have a lower energy consumption compared to incandescent lamps, they are extensively used in industrial and commercial environments, which commonly require emergency lighting. It is desired to provide for electronic ballast system for operating one or more fluorescent lamps and having a subsystem with a battery, along with a battery charger, and associated logic to provide for emergency lighting.

Electronic ballast systems that operate fluorescent lamps are commonly plagued by the disadvantage that they produce electromagnetic interference (EMI) and radio frequency interference (RFI). It is desirable to provide for an electronic ballast system that reduces or even eliminates the EMI/RFI noise commonly produced by the electronic ballast systems.

Electronic ballast circuits commonly employ inductive loads, which act to lower the power factor, which, in turn, increases the consumption of current and, thereby, reduces the efficiency related to fluorescent lamps. It is desirable that an electronic ballast circuit be provided with a power factor correction circuit that allows for the creation of a power factor that approaches unity, thereby furthering the efficiency of the electronic ballast system.

SUMMARY OF THE INVENTION

The invention is directed to an electronic ballast system for operating one or more fluorescent lamps with universal input (from 108V to 305V) and having a subsystem with a battery, along with a battery charger and associated logic, that provides for emergency lighting. The electronic ballast system allows for the operation of fluorescent lamps without preheating their cathodes, as well as a circuit for power factor correction that allows electronic circuit to have a power factor that approaches unity.

The electronic ballast system comprises: (a) an EMI filter having an input connected to an electric surge and providing a filtered output; (b) a full-wave rectifier having an input connected to the output of said EMI filter and providing a first d.c. voltage; (c) a power factor correction circuit having an input connected to the output of the full-wave rectifier and providing a power factor regulated output; and (d) a first inverter ballast circuit having an input connected to the output of the power factor converter. The inverter ballast circuit has a sweep frequency circuit for supplying an oscillating current to power a first fluorescent lamp without the need of preheating its cathode.

DESCRIPTION OF THE PREFERRED EMBODIMENTS

Figure 1:
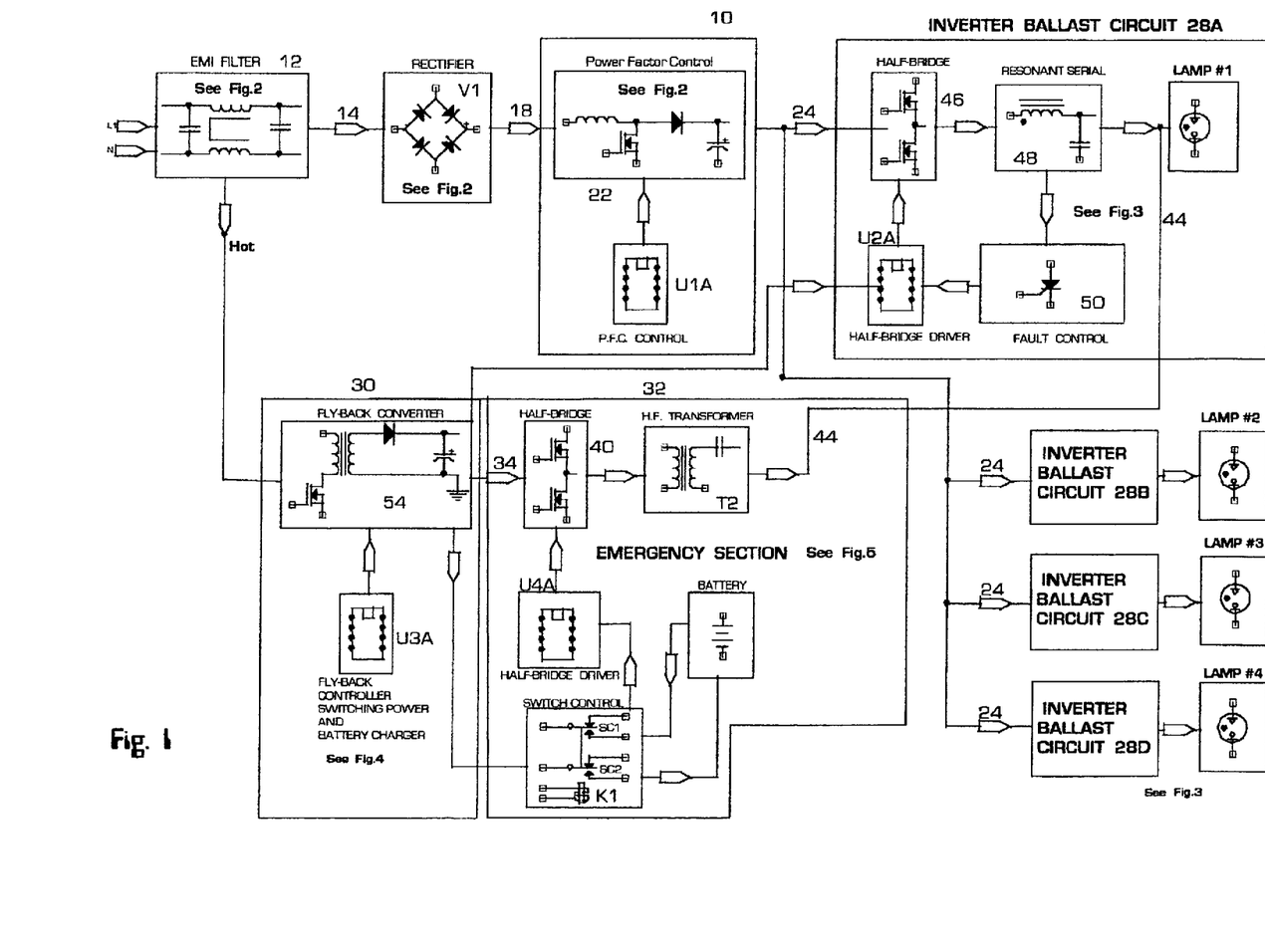
FIG. 1 is a block diagram of the electronic ballast system of the present invention.

With reference to the drawings, wherein the same reference number indicates the same element throughout, there is shown in FIG. 1 an electronic ballast system 10 for operating one or more fluorescent lamps and having the capability of providing for emergency lighting.

The electronic ballast system 10 comprises an electromagnetic interference (EMI) filter 12 having input terminals L1 and N, connected to a source of current, and providing a filtered output on signal paths 14 and 16. The electronic ballast system 10 further comprises a full-wave rectifier V1 having its inputs connected to signal paths 14 and 16 of the EMI filter 12 and providing a first rectified d.c. voltage on signal paths 18 and 20. A power factor correction circuit 22 has its inputs connected to signal paths 18 and 20 of the full-wave rectifier V1 and provides a power factor regulated output on signal paths 24 and 26.

The electronic power system further comprises a first inverter ballast 28A and preferably further comprises three additional inverter ballast circuits 28B, 28C, and 28D. Each of the inverter ballast circuits 28B, 28C, and 28D has their inputs connected to the signal paths 24 and 26 of the power factor correction circuit 22. Further, each of the ballast circuits 28A, 28B, 28C, and 28D has a sweep frequency circuit supplying an oscillating current to provide power to a fluorescent lamp into its operating or running mode without the need of first preheating the fluorescent lamp.

The electronic ballast system 10 has a capability of providing for emergency lighting from a subsystem comprised of a switching power and battery charger 30 and an emergency section 32.

The switching and battery charger 30 has a power supply having its inputs connected across hot and ground terminals of the EMI filter 12 and provides a second d.c. voltage having positive and negative potentials applied to signal paths 34 and 36, respectively.

The emergency section 32 has a switch K1 allowing connection to the signal paths 34 and 36 and has a plurality of contacts SC1 and SC2. The emergency section 30 further comprises a diode D16 having an anode and cathode with the anode connected to the positive potential on signal path 34. The emergency section 30 still further comprises a battery having positive and negative terminals with a negative terminal connected, by way of signal path 38, to the negative potential on signal path 36 and the positive terminal thereof connected to the cathode of the diode D16.

The emergency section further includes a second ballast inverter comprised of a half-bridge driver U4A, a half-bridge arrangement 40, and a high voltage tranformer T2. The second inverter circuit has an input and output arranged by means of the plurality of the switch contacts SC1 and SC2 so as to interconnect the positive and negative terminals of the battery when the second d.c. voltage normally applied across terminal 34 and 36 is absent The second inverter circuit has a sweep frequency circuit for supplying an oscillating current to a first fluorescent lamp without the need of first preheating the first fluorescent lamp in a manner similar to that of inverter ballast circuits 28A, 28B, 28C, and 28D. The second inverter ballast circuit further comprises means, to be discussed with reference to FIG. 5, for energizing signal paths 42 and 44 so as to excite the fluorescent lamp of the inverter ballast circuit 28A.

The electronic ballast system 10, more particularly, the EMI filter 12 is comprised of a plurality of elements as listed in Table 1, and may be further described with reference to FIG. 2.

TABLE 1

| Element | Typical Value/Type |
| --- | --- |
| S11 | Conventional fuse |
| R1 | Varistor |
| C1 | Film Capacitor (Interference Suppressor) |
| C2 | Film Capacitor (Interference Suppressor) |
| C3 | Film Capacitor (Interference Suppressor |
| L1 and L2 | Common mode inductor |

The purpose of the EMI filter 12 is to reduce or even eliminate the electromagnetic interference (EMI) and radio interference (RFI) serving as sources of noise that would otherwise most likely be produced by the electronic ballast system 10. This electrical noise can interfere with the operation of televisions, radios, telephones, and similar equipment. Further, this electrical noise can be conducted through power lines which radiate and create disturbances in external equipment.

The EMI filter 12 is connected across the source of voltage which, because of benefits of the present invention, may vary from about 100 to 305 volts a.c. with a frequency variation between 50–60 Hz. The EMI filter 12 is comprised of the common mode inductors L1 and L2, wound around the same core and operatively connected to capacitors C1, C2, and C3 arranged as shown in FIG. 1, and provides RFI/EMI filtering of common mode noise. Additionally, the EMI filter 12 includes a fuse S11 that provides for over current protection and a varistor R1 that provides protection against high voltage spikes. The EMI filter 12 provides a filtered output on signal paths 14 and 16, which is applied across a full-wave bridge rectifier V1 comprised of conventional diodes arranged as shown in FIG. 2.

Figure 2:
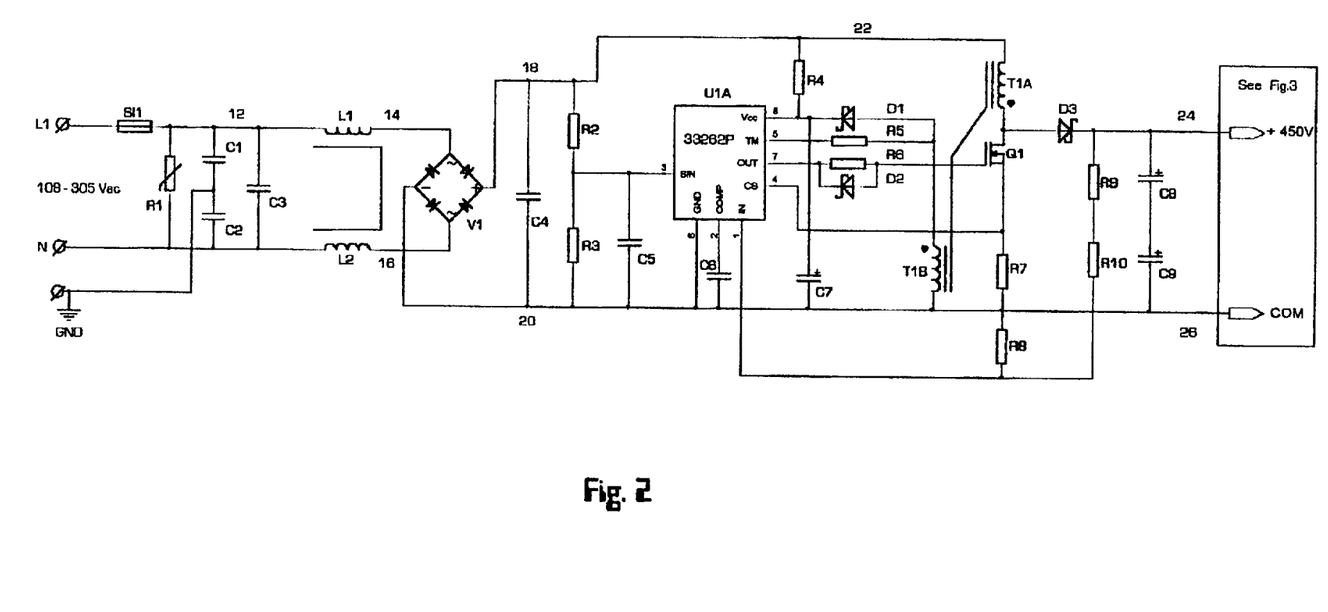
FIG. 2 is a schematic illustrating the EMI filter, rectifier, and power factor correction (PFC) circuit of all of FIG. 1.

The full-wave bridge V1 operates in a usual way to convert the filtered output of the EMI filter 12 into a d.c. voltage which is applied, via signal paths 18 and 20, across a leveling capacitor C4, which is part of the power factor correction (PFC) circuit 22 comprised of the plurality of elements given in Table 2 and arranged as shown in FIG. 2.

TABLE 2

| Element | Typical Value/Type |
| --- | --- |
| C4 | Electrolytic Capacitor (Smoothing Capacitor) |
| C5 | Film Capacitor |
| C6 | Film Capacitor |
| C7 | Electrolytic Capacitor |
| C8 | Electrolytic Capacitor |
| C9 | Electrolytic Capacitor |
| R2 | Resistor |
| R3 | Resistor |
| R4 | Resistor |
| R5 | Resistor |
| R6 | Resistor |
| R7 | Resistor |
| R8 | Resistor |
| R9 | Resistor |
| R10 | Resistor |
| D1 | Diode Fast Recovery |
| D2 | Diode Fast Recovery |
| D3 | Boost diode |
| Q1 | Controlled power switch |
| T1 having winding T1A and T2A | High Frequency Transformer |
| U1A | Power Factor Control |

The purpose of the power factor correction circuit 22 is to derive a power factor for the electronic ballast system 10 that approaches unity. The power factor correction circuit 22 is preferred to be implemented into the electronic ballast system 10 because the electronic ballast system 10, as well as all known ballast circuits, uses inductors which tend to reduce the power factor as seen by the source of a.c. excitation supplying the electronic ballast system 10. This lowering of the power factor disadvantageously increases the consumption of power related to the fluorescent lamps and the magnetic ballast components. Typically this reduction in the power factor and related inductive disturbances creates a 40% increase in power consumption. The power factor correction circuit 22 of the present invention performs an active correction of the power factor typically bringing it almost to unity (0.98%) and accomplishes this correction by forcing present its output signal paths 24 and 26 to follow the average primary current of the ac supplying the electronic ballast system 10. Further, the power factor correction circuit 22 maintains a dc voltage of approximately 450 volts that is stabilized regardless of the fluctuation of the a.c. that may vary from 108 to 350 volts.

In general, and with simultaneous reference to FIGS. 1 and 2, the power factor correction circuit 22 comprises an inductor T1 having a first winding T1A having input and output terminals with the input terminal connected to the positive terminal 18 of the full-wave rectifier V1. The power factor correction circuit 22 further comprises a power switch Q1 having first (1) second (2) and third (3) electrodes with the first electrode (1) connected to the output terminal of the winding T1A. The power factor correction circuit 22 further comprises a diode D3 having an anode and a cathode with the anode connected to the output of the first winding T1A and a cathode connected to the positive terminal 24 of the second dc output generated by the power factor correction circuit 22.

Capacitive means comprised of capacitor C8 and C9, is arranged across the positive and negative terminals connected to signal paths 24 and 26. A P.F.C. controller U1A having an input and an output with the input (pin 3) connected across the positive and negative terminals present on signal paths 18 and 20 and is connected there to by means of a network comprised of capacitors C4 and C5 and resistors R2 and R3 arranged as shown in FIG. 2. The P.F.C. controller U1A has circuitry, including a pulse width modulation control, so that the controller U1A provides an output that varies in accordance with the primary current created by the full-wave rectifier V1. The controller U1A is connected to the second (2) electrode of the power switch Q1 and the P.F.C. controller U1A is also connected to the third electrode (3) of the power switch Q1.

The P.F.C. controller U1A contains a wideband voltage amplifier used in an internal feedback loop, an overvoltage regulator, a quadrant multiplier having a wide linear operating range, a current sense capacitor, a zero current detector, a pulse width modulator (PWM) having associated logic circuitry, a totem-pole arranged MOSFET driver, an internal voltage reference, a restart timer, and an under voltage lockout circuit. The controller U1A is interconnected into the circuitry shown in FIG. 2 by means of its pins 1–8.

Pin 1 (IN) of the P.F.C. controller U1A serves as a voltage amplifier inverting input. This pin 1 is connected, via a resistive divider R9, R10, and R8, to the signal path 24. Pin 2 (COMP) of P.F.C. controller U1A serves as a voltage amplifier output and is the output of the error amplifier (and one of the two inputs to the internal quadrant multiplier). A feedback compensation network, contained in the P.F.C. controller U1A, reduces the frequency block gain to advantageously avoid an attempt by the P.F.C. controller U1A to control the output voltage ripple (120 Hz) carried on signal paths 24 and 26. This pin 2 is connected, via capacitor C6, to the ground connection Pin 3 (MULT) of the P.F.C. controller U1A serves as the second input to quadrant multiplier. Pin 3 is connected, through a resistive divider R2, R3, to signal paths 18 and 20. Pin 4 (CS) of the P.F.C. controller U1A serves as an input to the current sense comparator. This input (Pin 4) provides the instantaneous MOSFET current derived from power switch Q1 and which current is represented by a proportional voltage signal created across an external sense resistor R7. This proportional voltage signal is compared with the threshold set by the quadrant multiplier output, and when the resulting current therefrom exceeds the set value, the power MOSFET Q1 will be turned off by a reset signal provided by the quadrant multiplier and remains off until the next set pulse id generated by the PWM latch of the quadrant multiplier.

Pin 5(FM) of the P.F.C. controller U1A serves as the input zero current detector. Pin 5 is connected, through a limiting resistor R5, to the auxiliary winding T1B of the inductor T having the primary winding T1A. Pin 5 provides a zero coil current and voltage function for the P.F.C. controller U1A which processes the inductor signal derived from auxiliary winding T1B and turns on the external MOSFET Q1 as the voltage at pin 5 crosses the threshold level set by the quadrant multiplier. Pin 6 (GND) of the P.F.C. controller U1A is the common reference of the circuitry of FIG. 2. Pin 7 (OUT) of the P.F.C. controller U1A is output of the totem-pole arranged MOSFET driver. This pin 7 serves to drive the external MOSFET Q1. Pin 8 (Vcc) of the controller U1A carries the supply voltage. This pin 8 is externally connected to a rectified diode D1 and a filter capacitor C7 as shown in FIG. 2.

The P.F.C. controller U1A operates within a voltage range of 108V to 305V and uses average current mode PWM control to provide line and load compensations. The P.F.C. controller U1A uses an optimum current control method. More particularly, the controller U1A uses an average current control implemented by using feed forward line regulation and a variable switching frequency. An oscillator, within the P.F.C. controller U1A, simultaneously turns on the MOSFET power switch Q1 and starts the ramp of the PWM current control to regulate the output present on signal paths 24 and 26.

The average inductor current present on pin 4 of the P.F.C. controller U1, is compared with a current reference generated by means of a current error amplifier of the quadrant multiplier. The P.F.C. controller U1A operates as an integrator, allowing the P.F.C. controller U1A to accurately provide an output that follows the current reference generated by the quadrant multiplier.

A so called "feed forward compensation" of the voltage present on signal paths 18 and 20 has been added to the quadrant multiplier of the P.F.C. controller U1A in order to provide a constant voltage control loop bandwidth of the P.F.C. controller U1A in spite of fluctuations that may be present on signal paths 18 and 20. A quadrant multiplier input allows external compensation to be applied to the current modulation quadrant. The oscillator within the P.F.C. controller U1A operates at a modulated switching frequency. Thus, the frequency of the PWM control signal output has its minimum, nominal value of approximately 20 KHz when the input voltage from rectifier V1 is at its minimum, zero value, and the frequency of the PWM control signal output has its maximum value of approximately 40 KHz when the input voltage from rectifier V1 is at its peak value.

The frequency of the pulse-width modulated control signal produced by the P.F.C. controller U1A, determines the current drawn from the full-wave rectifier V1 and hence from the AC supply line. By forcing the current produced by the P.F.C. controller U1A present on signal paths 24 and 26 to vary in accordance with the applied line voltage, the line current is forced to become sinusoidal, endowing the power factor correction circuit 22 with a near-unity power factor and low harmonic distortion. The output voltage value of the power factor correction circuit 22 can be adjusted by means of the resistor divider R9, R10, R8, and is typically set at 450V d.c. The output of the power factor correction circuit is routed, via signal paths 24 and 26 to the plurality of inverter power circuits 28A, 28B, 28C, and 28D, each comprised of a plurality of elements shown in Table 3 and each of which may be further described with reference to FIG. 3.

TABLE 3

| Element | Typical Value/Type |
| --- | --- |
| C10 | Electrolytic Capacitor |
| C11 | Film Capacitor |
| C12 | Film Capacitor |
| C13 | Film Capacitor |
| C14 | Film Capacitor |
| C15 | Film Capacitor |
| C16 | Electrolytic Capacitor |
| C17 | Film Capacitor |
| R11 | Resistor |
| R12 | Resistor |
| R13 | Resistor |
| R14 | Resistor |
| R15 | Resistor |
| R16 | Resistor |
| D4 | Diode Rectifier |
| D5 | Diode Rectifier |
| D6 | Diode Rectifier |
| D7 | Diode Zener |
| D8 | Diode Fast Recovery |
| D9 | Diode Fast Recovery |
| Q2 | Power Mosfet |
| Q3 | Power Mosfet |
| Q4 | Diode SCR |
| L6 | High Frequency |
| U2A | Integrated Circuit type IR21531D |
| 52 | Fluorescent lamp |

Figure 3:
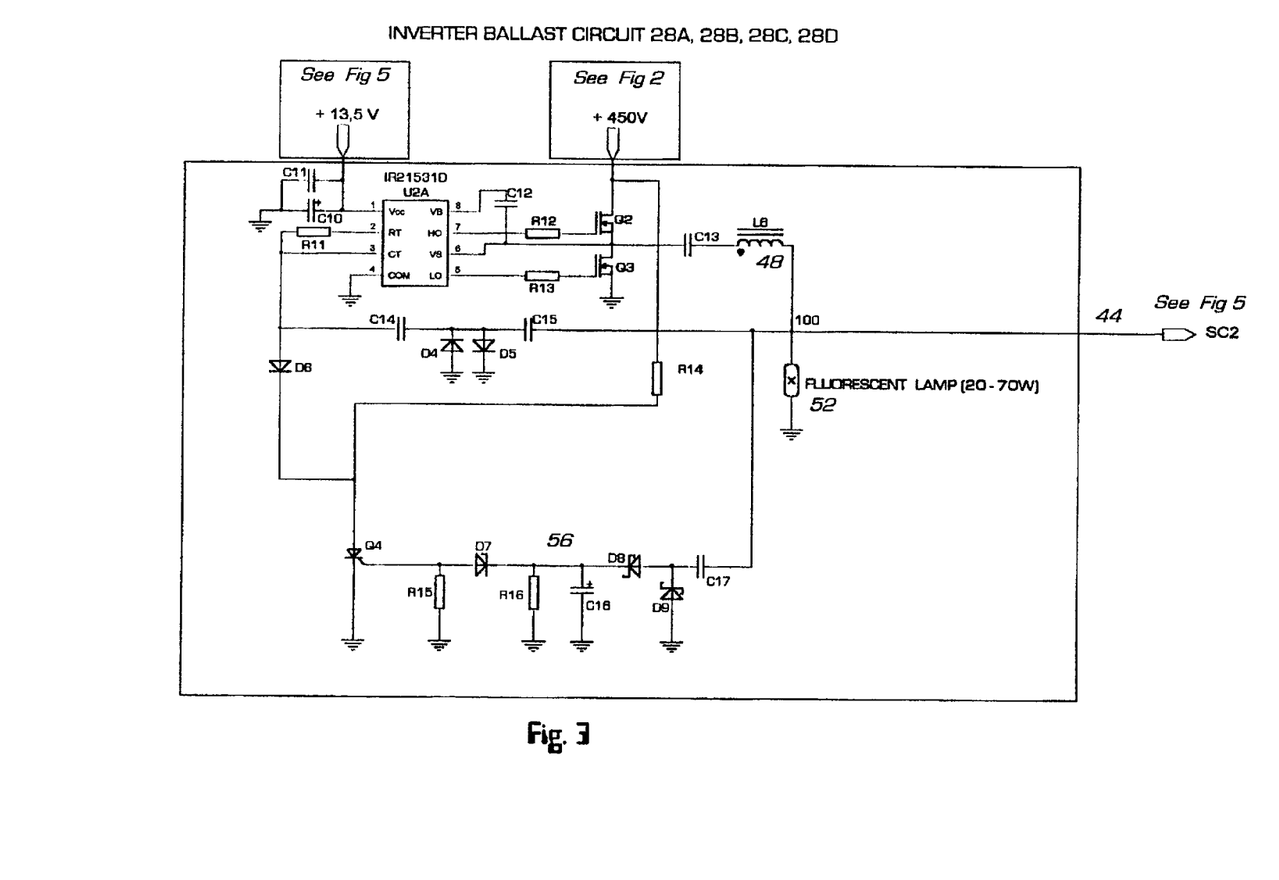
FIG. 3 is a schematic of the inverter ballast of FIG. 1.

Each of the inverter power circuits 28A, 28B, 28C, and 28D comprises a half-bridge arrangement 46 made up of MOSFET devices Q2 and Q3, a half-bridge driver U2A, a resonant circuit 48 made up of capacitor C13 and inductor L6, and a pair of diodes D4 and D5 Net of the synchronism) connected in bidirectional mode, all as shown in FIG. 3, as well as in FIG. 1.

The MOSFET devices Q2 and Q3 each have first (1) second (2) and third (3) electrodes. The MOSFET Q2 has its first (1) electrode connected to the positive d.c. voltage present on signal path 24, its third (3) electrode connected to the first end of the resonant circuit 48, whereas the first (1) electrode of the MOSFET Q3 is also connected to the first and to the resonant circuit 48, and the third (3) electrode of the MOSFET Q3 is connected to a ground connection.

The half-bridge U2A provides first and second outputs that control the operation of a half-bridge arrangement 48, which operatively provides an oscillating current to energize the fluorescent lamp 52. The resonant circuit 48 has a second end connected to a first cathode of the fluorescent lamp 52, which, in turn, has a second cathode connected to the ground connection.

The pair of diodes D4 and D5 are arranged in a bidirectional manner with respect to ground and are interposed between first cathode of the fluorescent lamp and a second output of the half-bridge driver U2A.

The half-bridge driver U2A has its pin 1 directly connected to a positive source of voltage 13.5, to be later described with reference to FIG. 5, and serves as the controller for providing the circuit arrangement of FIG. 3 to serve as a self-oscillating half-wave.

Each of the inverter ballast circuits 28A, 28B, 28C, and 28D is set to oscillate at a fixed frequency of around 40 kHz determined by the net resistance-capacitance made up by the resistor R11 and the capacitor C14. In operation, when pin 1 of the half-wave driver U2A receives a positive voltage of +13.5V, and on the drain of the MOSFET Q2 receives a positive voltage of +450V, the inverter ballast circuits 28A, 28B, 28C, or 28D begins to oscillate and initially performs a frequency sweep to automatically look for the correct frequency of resonance (corresponding to that which energizes the fluorescent lamp into its running mode) determined by the values selected for the inductor L6, the capacitor C15 and the type of fluorescent lamp 52.

Unlike prior electronic ballast circuits, the inverter ballast circuits 28A, 28B, 28C, and 28D cause the fluorescent lamp 52 to rapidly seek its operating mode without having the cathodes of fluorescent lamp 52 preheated. This rapid ignition is provided by the bi-directional arrangement of the diodes D4 and D5 operatively cooperating with capacitor C14 and C15, arranged as shown in FIG. 3, and with the half-bridge driver U2A providing an oscillating current on its pin 3 (CT). The parameters of the inverter ballast circuits 28A, 28B, 28C, and 28D may be selected to provide the desired power to operate any of the different types of fluorescent lamps, such as T5, T8, T12, 20W, 32W, 40W, 56W, 70W, linear, circular, or U shaped fluorescent lamps.

Since the fluorescent lamp 52 is turned on with a direct ignition (without being preheated), it is possible to operate the fluorescent lamp 52 by means of only two wires. In fact, from FIG. 3 it should be noted that the fluorescent lamp 52 is connected from one side to the 100V connection and from the other side to the fluorescent lamp 52 common ground. The half-bridge oscillator provided by each of the inverter ballast circuits 28A, 28B, 28C, and 28D feeds the fluorescent lamp in a series resonant arrangement, such particular configuration offers advantages of being adequately protected against possible damage owed to conditions of an absent lamp 52, broken cathodes in lamp 52, lighting failure of lamp 52, and interruption of connection of the lamp 52.

In the case wherein one of the above anomalies, for example, the half-bridge driver U2A finds itself without a load and instantly, in response to errors signals, performs a very rapid frequency sweep to find the new resonant condition, but being there is no load, the error signals related to the half-bridge driver U2A rise and accordingly the current produced by the half-bridge driver U2A for a brief time manifests excessive values, thereby jeopardizing the integrity of the inductor L6 and of the MOSFETS Q2, and Q3 that inevitably will destroy some component. This possible damage is prevented by the fault control logic 50 shown in FIG. 1, but more clearly in FIG. 3 as being comprised of components C17, D9, D8, C16, R16, D7, R15, Q4, D6, and R14.

In operation, if, as it was mentioned before, lamp 52 is absent, and if the half-bridge driver U2A fails to find the correct resonant frequency related to the particular fluorescent lamp 52, causing an increase in the disturbance values of current and voltage delivered to the 100V line and that are present at capacitor C17, these disturbances will be passed on to diodes D8 and D9. The diodes D8 and D9 rectify the disturbances and deliver the rectified quantities to an electrolyic capacitor C16 and resistor R16 which, in turn, filter the rectified disturbances. The capacitor C16, in cooperation with zener diode D7, develops a voltage that renders the SCR Q4 conductive which, in turn, causes pin 3 of the half-bridge driver U2A to be brought to ground, by way of diode D6 and SCR Q4, which, in turn, causes the half-bridge driver U2A to be shutdown which, in turn, immediately extinguishes the oscillation of the inverter ballast circuit 28A, 28B, 28C, or 28D, thereby, eliminating any condition of danger that would damage the inductor 26 and the MOSFETS Q2 and Q3.

Once activated by the shutdown of half-bridge driver U2A, the 100V line is not subjected to any disturbance voltage and/or, current and, therefore, the SCR Q4 is rendered inoperative and its anode is connected to a positive voltage through the resistor R14.

To restore the condition of operation of the half-bridge driver U2A, it is only necessary to remove the cause that provoked the shutdown on half-bridge driver U2A, by for example, inserting a fluorescent lamp 52 or replacing a defective fluorescent lamp 52. The automatic reactivation of operation of the driver has not been inserted only for safety reasons intrinsic of the personnel employed to the maintenance. Obviously, the shutdown of the half-bridge driver U2A is separately activated for the inverter ballast circuits 28A, 28B, 28C, and 28D. Accordingly, if an inverter ballast circuit, such as 28A, is deactivated, the remaining inverter ballast circuits 28B, 28C, and 28D remain fully operative.

It should now be appreciated that the practice of the present invention provides for an electronic ballast system that operates with the universal input having a voltage range of between 108 to 350 volts ac, and a frequency range of between 50–60 Hz. The electronic ballast system of the present invention allows for the direct lighting of fluorescent lamps without any preheating of the cathodes thereof, thereby, allowing the electronic ballast to service the fluorescent lamps by the provisions of only two separate wires. Further, the electronic ballast system of the present invention having individual ballast circuits 28A, 28B, 28C, and 28D, allows for individual control of every fluorescent lamp whereas each of the individual ballast circuits 28A, 28B, 28C, and 28D provides for a selected power to a variety of fluorescent lamps, such as T5, T8, T12, 20W, 32W, 40W, 56W, 70W, linear, circular, or U shape fluorescent lamps.

In the planning of the building, the integration of illumination for emergency purposes needs to be provided and such illumination must conform to various building codes and also to various legislative requirements. Particularly, these legislative requirements demand that when a building, that is frequented by the public, loses its primary source of power causing the loss of its ordinary lighting, then an auxiliary system is immediately provided for emergency purposes. Lighting for emergency purposes must clearly take into account the need to point out the exits through customized signaling, the routes of emergency egress along hallways to allow a steady flow of people out of the related building, and to ensure that alarms and fire retarding equipment are clearly identified by the emergency lighting.

Typically, emergency lighting is divided into safety and backup components. The purpose of the safety light is to ensure the proper evacuation of the building and to make sure that evacuation will be accomplished in a safe manner. The backup lighting commonly requires lighting to be provided on a continuous basis, so that various jobs may be performed by those employed in the related buildings.

Safety lighting is supplied, in the case of mains failure, within the extremely brief time of 0.5 seconds and this operation is accomplished automatically. So too is the return to normal power when the cause of failure has been corrected.

Commonly devices used in emergency illumination include nickel cadmium (Ni—Cd) that may be operated autonomously for at least an hour and have an operation life of at least four (4) years.

The electronic ballast system 10 of the present invention includes a switching power and battery charger 30 and an emergency section 32 that allows the fluorescent lamp of the emergency section to be energized by its battery.

System 10, the emergency system of this invention, provides that when the main fails, one (1) fluorescent lamp will be kept alight by the automatic operation of the system. So that if the established configuration of the lighting has four (4) lamps, one (1) lamp will remain alight, if three (3) lamps, one (1) will remain on, if two (2) lamps, one (1) will take over.

The emergency section 32 of the present invention provides emergency power for fluorescent lamps, which can be of the 18W to 70W type. The emergency illumination of the present invention may be further described with reference to FIG. 4, showing the switching power and battery charger 30, which is comprised of a plurality of elements given in Table 4.

TABLE 4

| Element | Typical Value/Type |
|---------|--------------------|
| C18A    | Electrolytic Capacitor |
| C18B    | Electrolytic Capacitor |
| C19     | Film Capacitor |
| C20     | Film Capacitor |
| C21     | Electrolytic Capacitor |
| R17     | Resistor |
| R18     | Resistor |
| D10     | Diode Fast Recovery |
| D11     | Diode Fast Recovery |
| D12     | Diode Zener |
| T1      | High Frequency Transformer |
| OC1     | Optocoupler |
| U3A     | Integrated Circuit |

Figure 4:
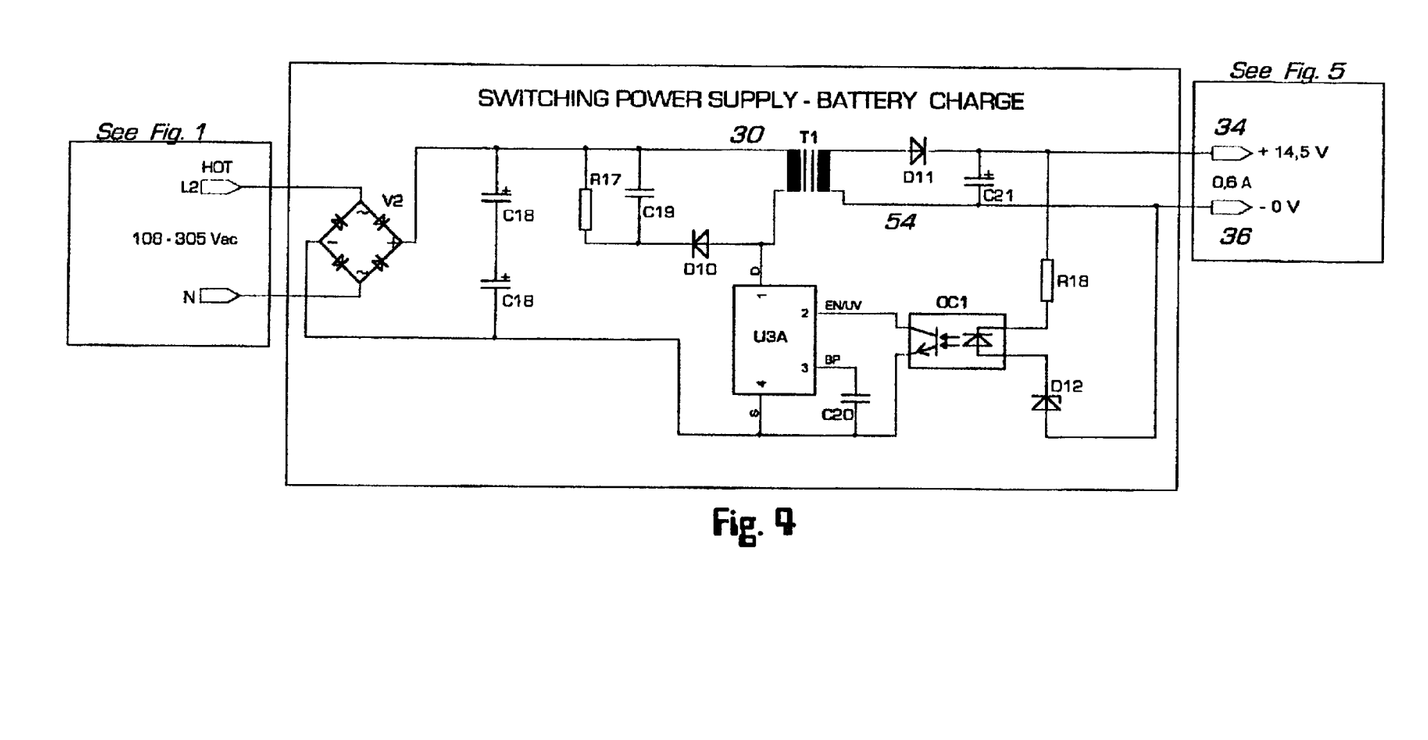
FIG. 4 is a schematic of the switching power and battery charger of FIG. 1.

FIG. 4 shows the switching power and battery charger 30 as having its inputs connected to the hot and ground terminals of the EMI filter 12 of FIG. 2. It is of particular importance that the hot connection of the switching power and battery charger 30 be maintained so as to not interrupt the function of the emergency lighting supply.

Figure 5:
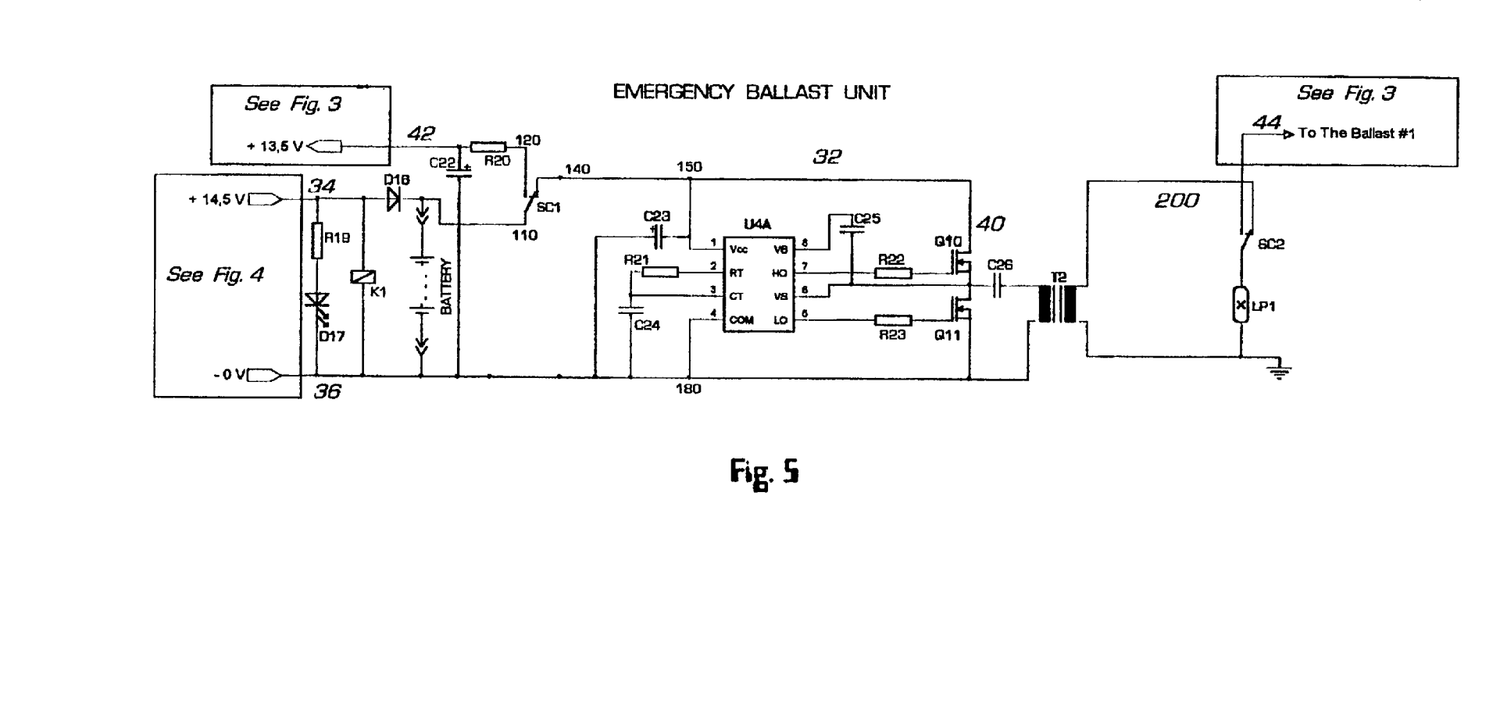
FIG. 5 is a schematic of the emergency section of FIG. 1.

An essential element of the switching power and battery charger 30 is the fly-back controller U3A, which in an integrated circuit and operatively cooperates with other components shown in FIG. 4, as well as components shown in FIG. 5 to be described, to produce a stabilized dc voltage having a value of about +13.5 volts derived from an ac source having a voltage variation of between 108 to 350 volts ac, which is essentially the same ac source of voltage feeding the EMI filter 12. The fly-back controller U3A includes a high voltage (700V) power MOSFET switch with an internal power ballast controller. Unlike the P.F.C. controller U1A of FIG. 2, employing a conventional pulse-width modulator, the fly-back controller U3A uses a simple ON/OFF control to regulate the voltage output provided on its signal paths 34 and 36. The fly-back controller U3A consists of an oscillator, an enabler circuit, an under-voltage circuit, an over-temperature protection arrangement, a current limit circuit, and the 700 volt power MOSFET. The fly-back controller U3A is interconnected to the circuit elements of FIG. 4 by way of pins 1–4.

Pin 1 (D) of the fly-back controller U3A serves as its MOSFET drain connection and provides a signal for creating internal operating current for both start-up and steady-state operation Pin 2 (EN/UV) of the fly-back controller U3A provides an under-voltage and enable function The under-voltage internal circuitry disables the power MOSFET when the bypass pin (pin 3) voltage drops below a prefixed voltage value. The enable function of pin 2 determines whether or not to proceed with a next switch cycle. In operation, once a cycle is started the fly-back controller U3A always completes the cycle (even when enable pin 2 changes state halfway through the cycle). The enabler signal of pin 2 is generated on the secondary of the transformer T2 (by way of pin 2 of the fly-back controller U3A) by comparing the power supply output voltage present on signal paths 34 and 36 with an internal reference voltage. The enabler signal is high when the power supply output voltage is less than the reference voltage. This pin (2) is driven by an optocoupler (OC1) having a transistor. The collector of the optocoupler transistor is connected to the enabler pin (2) and the emitter of the optocoupler Transistor is connected to the source pin (5). The optocoupler has an LED which is connected in series with a zener diode (D12) across the DC output voltage present on signal paths 34 and 36 when the DC output voltage exceeds a target or predetermined regulation voltage level (optocoupler LED diode voltage drop plus zener voltage). For such conditions the optocoupler LED will start to conduct, pulling the enabler pin (1) low.

Pin 3 (BP) of the fly-back controller U3A serves as a BYPASS PIN, which is connected to a bypass capacitor C20. Pin 4 (S) of the fly-back controller serves as a SOURCE PIN for the internal power MOSFET.

The switching power and battery charger 30 operates from a full-wave rectifier V2 that receives the ac source (108–305 Vac). Capacitor C18 filters the rectified dc output from V2 and provides a delaying function to compensate for delays in the standby power provided by the switching power and battery charger 30 involved in the loss of the primary power. The rectified d.c. voltage is also applied to the primary winding of transformer T1 arranged in series with an integrated high voltage MOSFET inside of the fly-back controller U3A. A diode D10, a capacitor C19 and a resistor R17 comprise a clamping circuit that limits the turn-off voltage spikes presented to the fly-back controller U3A (drain pin) to a safe value. The voltage at the secondary winding of transformer T1 is rectified and filtered by D11 and C21 to provide a 14.5V dc output. The output voltage is determined by the sum of the optocoupler OC1 LED forward drop voltage and zener diode D12 voltage drop. The resistor R18, maintains a bias current through the zener diode 12 so as to improve its voltage response.

The fly-back controller U3A is intended to operate in a current limit mode. When enabled, the oscillator within the fly-back controller U3A turns the internal power MOSFET on at the beginning of each cycle. The internal MOSFET is turned off when the current ramps up to a predetermined current limit The maximum on-time of the MOSFET is limited to a DC maximum voltage associated with the oscillator. Since the current limit and frequency response of a given fly-back controller U3A are constant, the power delivered is proportional to the primary inductance of the transformer T1 and this power is relatively independent of the input voltage (108–305 ac). This primary inductance of the transformer T1 is calculated for the maximum power required and is supplied to the oscillator within the fly-back controller U3A, As long as the fly-back controller U3A is chosen to be rated for the power level at the lowest input voltage, the primary inductance will ramp up the current to the current limit before the voltage DC maximum limit of the associated oscillator is reached. The emergency section 32 of the electronic ballast circuit 10, may be further described with reference to FIG. 5 showing a plurality of elements given in Table 5.

TABLE 5

| Element | Typical Value/Type |
| --- | --- |
| R19 | Resistor |
| R20 | Resistor |
| R21 | Resistor |
| R22 | Resistor |

TABLE 5-continued

| Element | Typical Value/Type |
| --- | --- |
| R23 | Resistor |
| C22 | Electrolytic Capacitor |
| C23 | Electrolytic Capacitor |
| C24 | Film Capacitor |
| C25 | Film Capacitor |
| C26 | Film Capacitor |
| D16 | Diode Rectifier |
| D17 | Diode LED |
| K1 | Relay Double-Pole, Double Throw |
| T2 | High Frequency Transformer |
| Q10 | Power Mosfet |
| Q11 | Power Mosfet |
| LP1 | Fluorescent Lamp |
| Battery | Nickel-cadmium Type (12 volts) |

In general an essential feature of the emergency section 32 is to act as a high frequency inverter that converts the dc output of the battery into an alternating voltage having a typical value of 150 volts and a typical frequency of 33 Hz having a relatively low value of current. The high frequency inverter is used to turn on the fluorescent lamp LP1 being of a typical low-power (8W) type. The enablement of the usage of the battery is determined by the commutation provided by the switch control K1. The energizing of the switch control K1 causes the normally open contact SC1 to connect node 110, carrying a dc voltage of approximately 14.5, to node 120. This 14.5 volts is reduced to 13.5 by the operation of a resistor R20 and a capacitor C22 arranged as shown in FIG. 5. The 13.5 volts is applied to signal path 42 that is routed at least one inverter ballast 28A, 28B, 28C, or 28D, but shown in FIG. 1 as being routed to inverter ballast circuit 28A The normally closed contact SC1 related to the switch control K1 connects to the node 110 to node 140. Further, the switch control K1 as shown in FIG. 1 has a second set of contacts, in particular normally closed contact SC2, which connects junction 200 to the lamp LP1, as well as to the fluorescent lamp 52 of FIG. 3 by way of signal path 44. The high frequency inverter of the emergency section 32 utilizes a half-bridge driver U4A whose operation and internal components are the same as previously discussed for the controller U2A(see circuit 28A, 28B, 28C, 28D). The half-bridge driver U4A is operatively connected to MOSFETS Q10 and Q11 arranged in a half-bridge configuration 46 controlled, in part, by a capacitor C25 that is interconnected to the primary of the transformer 12 by way of capacitor C26. The capacitance of the capacitor C26 and the inductance of transformer T2 comprise a resonant circuit The half-bridge driver U4A is interconnected to the circuit of FIG. 5 by way of its pins 1–8.

Pin 1(Vcc) of the half-bridge driver U4A serves as the supply source for logic and a gate driver all within the half-bridge driver U4A. This pin 1 is connected to the positive 150 and to the capacitor C23. Pin 2 (RT) of the half-bridge driver U4A serves as an oscillator timing resistor input. This pin 2 is connected to the resistor R21. Pin 3 (CT) of the half-bridge driver U4A serves as an oscillator timing capacitor input. This pin 3 is connected to capacitor C24. Pin 4 (COM) of the half-bridge driver U4A serves as an IC power and signal ground. This pin 4 is directly connected to the common ground of the circuit of FIG. 5. Pin 5 (LO) of the half-bridge driver U4A serves as a low side to gate the output which drives MOSFET Q11. This pin 5 is connected to the gate of the MOSFET Q11 by resistor R23.

Pin 6 (VS) of the half-bridge driver serves a high voltage floating supply return. This pin 6 is connected to the junction between the drain of the MOSFET Q11 and the source of the MOSFET Q10, as well as to capacitor C25. Pin 7 (HO) of the half-bridge driver U4A serves as a high side to gate the MOSFET Q10. This pin 7 is connected to the gate of the MOSFET Q10 by resistor R22. Pin 8 (VB) of the half-bridge driver U4A serves as a high side to gate the MOSFET Q11 with a floating supply. This pin 8 is also connected to the capacitor C25.

In operation, that is, in case of a primary power failure, when the half-bridge driver U4A receives a positive voltage of about 13.6 volts coming from a battery, it begins to alternately oscillate at a fixed frequency of about 33 kHz determined by the value of capacitor C22 and resistor R20. This oscillation drives the two MOSFETS Q10 and Q11 arranged in a half-bridge configuration 40. The application of the voltage of 13.5 applied to the drain of Q10 (positive) and to the source of Q11 (negative) causes they half-bridge driver U4A to convert an alternating voltage to a square type form having the high frequency 33 kHz. The high frequency is established by the resonant circuit formed by the capacitor C25 and the primary inductance of transformer T2. The capacitor C25 serves to limit the current flowing in the transformer T2. The high frequency voltage present at the capacitor C25 is transferred to the secondary of transformer T2 by an appropriate selection of the ratio of the windings between the primary and secondary of transformer T2. This voltage appearing across the secondary winding of transformer T2 is raised to a value sufficient to render the fluorescent lamp LP1 into its operating state again without first sequencing the fluorescent through its preheat mode.

The emergency section 32 of FIG. 3 allows the fluorescent lamp LP1 be placed into its running mode and eliminates any annoying negative effects created by flickering typically experienced in low power fluorescent lamps, such as LP1, especially occurring during the preheat mode which is not applicable to the practice of the present invention. Conversely, the operation of the present invention causes the fluorescent lamp LP1, to provide a constant homogenous brightness.

The battery, shown in FIG. 5, has positive and negative terminals and may be of a nickel-cadmium type having twelve cells, each being 1.2 volts connected in series so as to provide a total current capability of 1.5 amps at 12 volts dc. The typical consumption of current by the circuit arrangement of FIG. 5 varies from a minimum of 0.4 amps (a lamp LP1 of 18W) to a maximum of 0.7 amps (a lamp LP1 of 60W). The battery for such variations can operate autonomously for at least one hour.

The current to charge the battery is approximately and preferably regulated to about ⅛ of an amp and provides an output of approximately 13.6 volts in response to a trickle charge of about twelve (12) hours. It is possible to increase the autonomy of the battery by selecting a battery having a maximum of six (6) amp hours and allowing for a charge to last for about four (4) hours.

In the overall operation of the present invention, when the primary power source is available, the switching power and battery charger 30 of FIG. 4 provides an input of 14.5 volts to the emergency section shown in FIG. 5. This input causes the indicator (ON) of the status of the battery charger to be display by LED D17 and the resistor R19. The presence of this 14.5 volts excites the relay K1 thereby commutating the contacts SC1 and SC2 causing normally opened contact SC1 to deliver the 13.5V (reduced from 14.5V by R20 and C22) to the inverter ballast circuits 28A, 28B, 28C, and 28D, by way of signal path 42. Conversely, the presence of the energized coil of switch control K1 causes the normally closed contact to open up, thereby removing the 14.5 volts to the half-bridge driver U4A. Further, the energizing of the switch control K1 causes the normally closed contact SC2 to open up, thereby removing the power from node 200 to the lamp LP1 and also to the lamp 52 of FIG. 3, otherwise energized by way of signal path 44.

Conversely, when the primary supply voltage is absent, the switch power and battery charger 30 does not produce the 14.5 volts otherwise applied to the emergency section 32 shown in FIG. 5. This absence causes the LED D17 to extinguish Further, the absence of the 14.5 volts from the switch power and battery charger 30 removes the excitation to the coil of relay K1, thereby allowing its normally closed contact SC1 and SC2 to be functional. The normally closed contact SC1, as shown in FIG. 5, causes the voltage from the battery to be delivered to node 140, which, in turn, is passed to the half-bridge driver U4A causing it to operate and supplying a oscillating current present on node 200 to the fluorescent lamp LP1 rendering it into its operating condition. Further, the oscillating current present on node 200 is delivered, via signal path 44 to lamp 52 of the selected inverter ballast circuit 28A, 28B, 28C, or 28D.

The transition of the emergency section 32 of FIG. 5 from its dormant condition, that is, the primary power being present, to its active condition, that is, when the primary power is lost, is dependent upon commutation time, which is optically 20 milliseconds for the relay K1. During the operation that provides for the emergency lighting, to avoid the battery from completely discharging so as to provide for a prolonged blackout, the emergency section of FIG. 5 utilizes a battery sensor circuit integrated in the half-bridge driver U4A. More particularly, pin 1 of the half-bridge driver U4A is internally connected and constantly monitors the d.c. voltage feeding the half-bridge driver U4A, and when this d.c. voltage drops below a particular value, such as 8.2 volts, the battery sensor immediately extinguishes the oscillator within the half-bridge driver U4A, thereby, setting the half-bridge driver U4A into its standby condition not energizing the fluorescent lamp LP1. The functionality or operational condition of the half-bridge driver U4A is restored when the voltage present on pin 1 again rises to a value of approximately 11 volts and then the battery begins its charge. Such a mechanism provides for the advantages in that it avoids damage to the cells of the battery, otherwise created by a complete discharge thereof, increases in the time for recharge, decreases in the value of current necessary for the recharge of the battery and correspondingly increases the operational life of the battery.

It should now be appreciated that the practice of the present invention provides for an electronic ballast system 10 having a subsystem with a battery, along with a battery charger and associated logic, that provides for emergency lighting, as well as for operating at least one of the fluorescent lamps of the inverter ballast circuits 28A, 28B, 28C, and 28D.

It is understood that the invention is not limited to the specific embodiments herein illustrated and described, but may be otherwise without departing from the spirit and scope of the invention.

What is claimed is:

1. An electronic ballast system comprising:
   a) an EMI filter having an input connected to a source of excitation and an output for providing a filtered output therefrom;
   b) a full-wave rectifier having an input connected to said output of said EMI filter and an output for providing a rectified dc voltage;

c) a power factor correction circuit having an input connected to said output of said full-wave rectifier and an output for providing a power factor regulated output therefrom;

d) a first inverter ballast circuit having an input connected to said output of said power factor correction circuit, said first inverter ballast circuit having a first sweep frequency circuit for supplying an oscillating current to power a first fluorescent lamp, without the need for preheating said lamp; and e) an emergency inverter ballast circuit for supplying power to said first fluorescent lamp when said first inverter ballast circuit is disabled, without preheating said first fluorescent lamp.

2. The electronic ballast system according to claim 1, wherein said EMI filter has hot and neutral terminals and wherein said electronic ballast system further comprises:

a) a power supply having, an input connected across said hot and neutral terminals and an output for providing a second dc voltage having a positive and negative potential;

switching means having an input connected to said output of said power supply and having a plurality of switch contacts;

c) a diode having an anode and a cathode with the anode thereof connected to said positive potential of said second dc voltage;

d) a battery having a positive terminal and a negative terminal with the negative terminal connected to said negative potential if said second dc voltage and the positive terminal connected to said cathode of said diode; and e) a second inverter ballast circuit having an input arranged by means of said plurality of said switch contacts to be interconnected to said positive and negative terminals of said battery when said second dc voltage of said power supply is absent, said second inverter ballast circuit having a sweep frequency circuit for supplying an oscillating current to a second fluorescent lamp without the need of preheating said second fluorescent lamp.

3. The electronic ballast system according to claim 2, wherein said second inverter ballast circuit further comprises means for supplying said oscillating current of said second inverter to said first fluorescent lamp.

4. The electronic ballast system according to claim 2, wherein said first inverter ballast circuit further comprises fault control logic arranged in parallel with said first fluorescent lamp and connected to an output and an input of said first sweep frequency circuit and having means for disabling said first sweep frequency circuit when said first fluorescent lamp becomes inoperable.

5. An electronic ballast system for operating four fluorescent lamps, including a first fluorescent lamp, a second fluorescent lamp, a third fluorescent lamp and a fourth fluorescent lamp, said electronic ballast system comprising:

a) an EMI filter having an input connected to a source of excitation and an output for providing a filtered output therefrom;

b) a full-wave rectifier having an input connected to said output of said EMI filter and an output for providing a rectified dc voltage;

c) a power factor correction circuit having an input connected to said output of said full-wave rectifier and an output for providing a power factor regulated output therefrom;

d) four inverter ballast circuits including a first inverter ballast circuit operatively associated with said first fluorescent lamp, a second inverter ballast circuit operatively associated with said second fluorescent lamp, a third inverter circuit operatively associated with said third fluorescent lamp and a fourth inverter circuit operatively associated with said fourth fluorescent lamp; and e) an emergency inverter ballast circuit supplying power to one of said fluorescent lamps when said other fluorescent lamps are disabled without preheating said fluorescent lamp.

6. The electronic ballast system according to claim 5, wherein said EMI filter has hot and neutral terminals and wherein said electronic ballast system further comprises:

a) a power supply having an input connected across said hot and neutral terminals and an output providing a second dc voltage having a positive and negative potential;

b) switching means having an input connected to said output of said power supply and having a plurality of switch contacts;

c) a diode having an anode and a cathode with the anode thereof connected to said positive potential of said second dc voltage;

d) a battery having positive and negative terminals with the negative terminal connected to said negative potential of said second dc voltage and the positive terminal connected to said cathode of said diode; and e) a second inverter ballast circuit having an input arranged by means of said plurality of said switch contacts to be interconnected to said positive and negative terminals of said battery when said second dc voltage of said power supply is absent, said second inverter ballast circuit having a sweep frequency circuit for supplying an oscillating current to said second fluorescent lamp without the need of preheating said second fluorescent lamp.

7. The electronic ballast system according to claim 5, wherein said second inverter ballast circuit comprises means for supplying an oscillating current of said second inverter ballast circuit to said first fluorescent lamp.

8. The electronic ballast system according to claim 5, wherein said first inverter ballast circuit comprises a sweep frequency circuit and fault control logic arranged in parallel with said first fluorescent lamp and connected to an output and an input of said sweep frequency circuit and having means for disabling said sweep frequency circuit when said first fluorescent lamp becomes inoperable.

* * * * *